United States Patent
Seo et al.

(10) Patent No.: US 9,036,216 B2
(45) Date of Patent: May 19, 2015

(54) FAX MACHINE AND METHOD OF PERFORMING HANDSHAKING PROCESS BASED ON T.30 PROTOCOL

(71) Applicant: SAMSUNG Electronics Co., Ltd., Suwon-si, Gyeonggi-do (KR)

(72) Inventors: Young-sang Seo, Seoul (KR); Chang-min Han, Ansan-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 64 days.

(21) Appl. No.: 13/857,188

(22) Filed: Apr. 5, 2013

(65) Prior Publication Data

US 2014/0118794 A1 May 1, 2014

(30) Foreign Application Priority Data

Nov. 1, 2012 (KR) .................. 10-2012-0123100

(51) Int. Cl.
*H04N 1/00* (2006.01)
*H04N 1/333* (2006.01)

(52) U.S. Cl.
CPC ......... *H04N 1/00031* (2013.01); *H04N 1/0001* (2013.01); *H04N 1/33323* (2013.01); *H04N 1/33346* (2013.01); *H04N 1/33392* (2013.01)

(58) Field of Classification Search
CPC ............ H04N 1/0001; H04N 1/00031; H04N 1/32789; H04N 1/32791; H04N 1/32795; H04N 1/33323; H04N 1/33346; H04N 1/33392; H04N 2201/0015; H04N 2201/3335; H04N 2201/33371
USPC ......... 358/400, 405, 406, 434, 435, 436, 438, 358/439, 442
See application file for complete search history.

(56) References Cited

U.S. PATENT DOCUMENTS

| | | | |
|---|---|---|---|
| 5,790,641 A * | 8/1998 | Chan et al. ............... | 379/100.17 |
| 5,835,579 A * | 11/1998 | Gersi et al. ............... | 379/100.17 |
| 2004/0001221 A1* | 1/2004 | McCallum ................. | 358/1.15 |

* cited by examiner

*Primary Examiner* — Thomas D Lee
(74) *Attorney, Agent, or Firm* — Staas & Halsey LLP

(57) ABSTRACT

A method of performing handshaking between fax machines on the basis of T.30 protocol includes transmitting information on a first data rate selected to transmit a fax document to a receiving-side fax machine, transmitting a plurality of frames including bit strings predefined to test data transmission/reception at the first data rate prior to transmitting the fax document to the receiving-side fax machine, and receiving a message informing success or failure of the test. The transmitting of the frames includes determining a time duration of the transmitting the frames based on at least one of a TCF flag value and the first data rate.

20 Claims, 9 Drawing Sheets

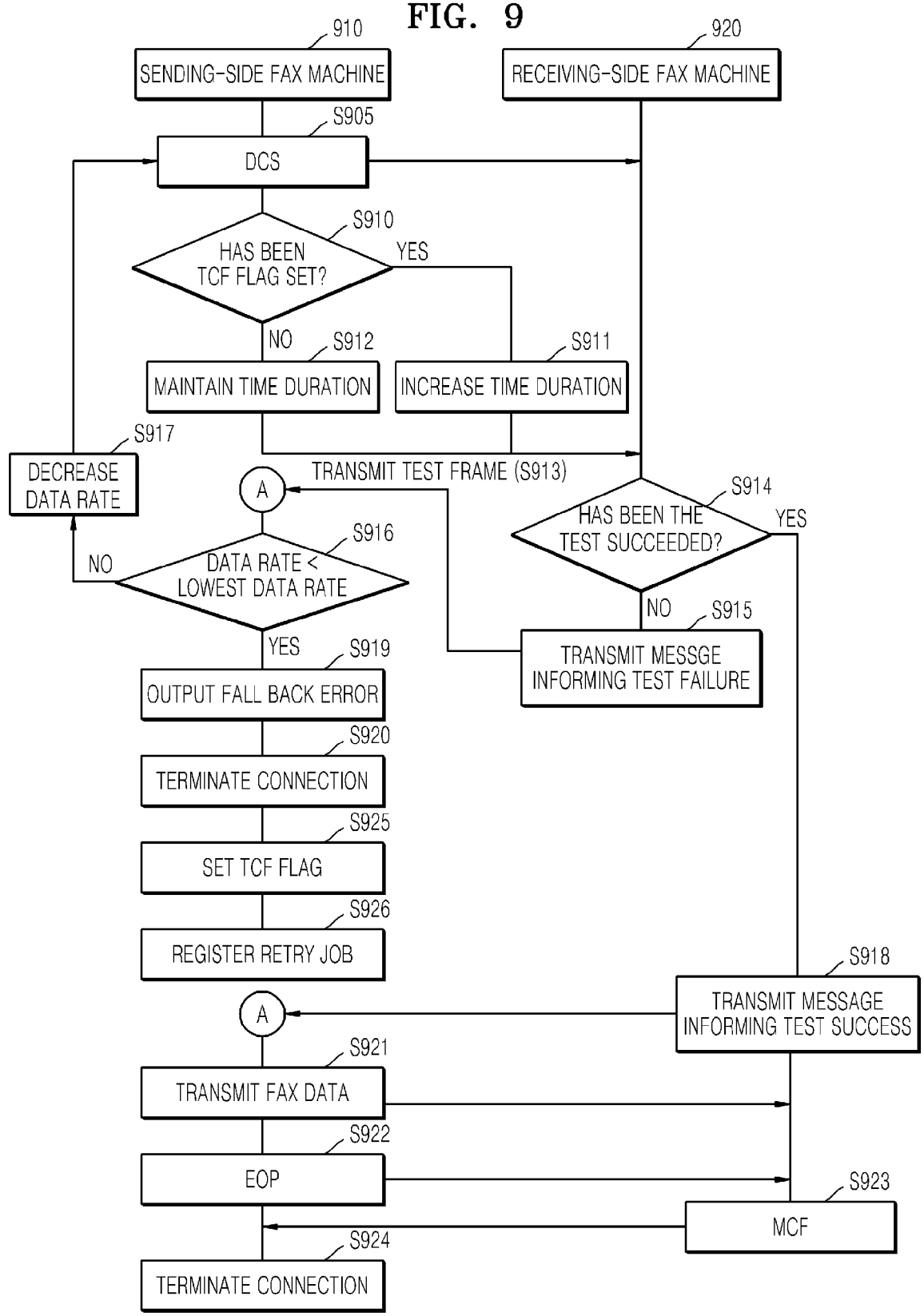

FAX MACHINE AND METHOD OF PERFORMING HANDSHAKING PROCESS BASED ON T.30 PROTOCOL

CROSS-REFERENCE TO RELATED APPLICATIONS

This application claims priority under 35 U.S.C. §119 from Korean Patent Application No. 10-2012-123100, filed on Nov. 1, 2012, in the Korean Intellectual Property Office, the disclosure of which is incorporated herein in its entirety by reference.

BACKGROUND OF THE INVENTION

1. Field of the Invention

The present general inventive concept relates to a method and device to perform a handshaking process by using T.30 protocol between a sending-side fax machine and a receiving-side fax machine to transmit fax documents.

2. Description of the Related Art

Recently, voice over internet protocol (VoIP) is being used to replace public switched telephone network (PSTN). Thus, the PSTN network and the VoIP network may be usable in various section of a communication path between sending and receiving terminals. While the VoIP network has an advantage that its communication cost is low, there is a problem that data including fax documents experiences the loss of packets passing through the VoIP network or noise increases since it has been optimized for the transmission of a voice signal.

For example, T.30 protocol is used for handshaking procedures between sending and receiving fax machines is on the premise that the PSTN network is used. Thus, the T.30 protocol is vulnerable to the latency, jitter, packet-loss properties of the VoIP network. Moreover, since the VoIP network performs filtering and coding suitable for a voice signal band, messages according to the T.30 protocol may be distorted. As a result, there is a high probability that the communication between fax machines fails

SUMMARY OF THE INVENTION

The present general inventive concept provides a handshaking method capable of enhancing a probability that communication succeeds between fax machines using T.30 protocol in an environment where a VoIP network and a PSTN network are used together.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of performing handshaking between fax machines on the basis of T.30 protocol, wherein a sending-side fax machine transmits information on a first data rate selected to transmit a fax document to a receiving-side fax machine, transmits a plurality of frames including one or more bit strings predefined to test data transmission/reception at the first data rate prior to transmitting the fax document to the receiving-side fax machine, and receives a message informing success or failure of the test, and wherein the transmitting of the frames comprises determining a time duration of the transmitting of the frames based on at least one of a TCF flag value set to the sending-side fax machine and the first data rate.

The foregoing and/or other features and utilities of the present general inventive concept may also be achieved by providing a computer readable recording medium to contain computer-readable codes as a program to execute the method describe above or hereinafter.

The foregoing and/or other features and utilities of the present general inventive concept may also be achieved by providing a sending-side fax machine that includes a scanning module to scan a fax document to be transmitted, a storage unit to store the scanned fax document, a network interface to transmit the fax documents through a public switched telephone network (PSTN) and/or a voice over internet protocol (VoIP) network, and a control unit to control the network interface to transmit information on a first data rate selected to transmit the fax document to the receiving-side fax machine, to transmit a plurality of frames including one or more bit strings predefined to test data transmission/reception at the first data rate prior to transmitting the fax document to the receiving-side fax machine, and to receive a message informing a success or failure of the test, wherein the control unit determines a time duration of the transmitting the frames based on at least one of a TCF flag value set to the sending-side fax machine and the first data rate.

The foregoing and/or other features and utilities of the present general inventive concept may also be achieved by providing a fax machine having a fax unit having mechanical and electrical components to perform a fax transmission or reception operation, the fax machine including a control unit configured to perform a first handshaking and a second handshaking with an external fax machine, to transmit information on a first data rate usable to transmit a fax document to an external fax machine when the first handshaking is completed, to determine a time duration based on at least one of a TCF flag value and the first data rate, to output one or more frames including one or more bit strings to the external fax machine as a test of data transmission/reception according to the first data rate and the time duration, to receive a message informing a success or a failure of the test according to a receiving state of the test, and to transmit a fax document independent of the frames to perform the fax transmission operation.

The foregoing and/or other features and utilities of the present general inventive concept may also be achieved by providing a fax machine having a fax unit having mechanical and electrical components to perform a fax transmission or reception operation, the fax machine including a control unit configured to perform a first handshaking and a second handshaking with an external fax machine, to receive information on a first data rate usable to receive a fax document from an external fax machine when the first handshaking is completed, to receive one or more frames including one or more bit strings from the external fax machine as a test of data transmission/reception at the first data rate and a time duration, to transmit a message informing a success or a failure of the test according to a receiving state of the test, and to receive a fax document independent of the received frames such that the fax reception operation is performed according to the received fax document.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 9 illustrates a method of determining a time duration of transmitting one or more test frames in the handshaking method of FIG. 5.

DETAILED DESCRIPTION OF THE PREFERRED EMBODIMENTS

Figure 1:
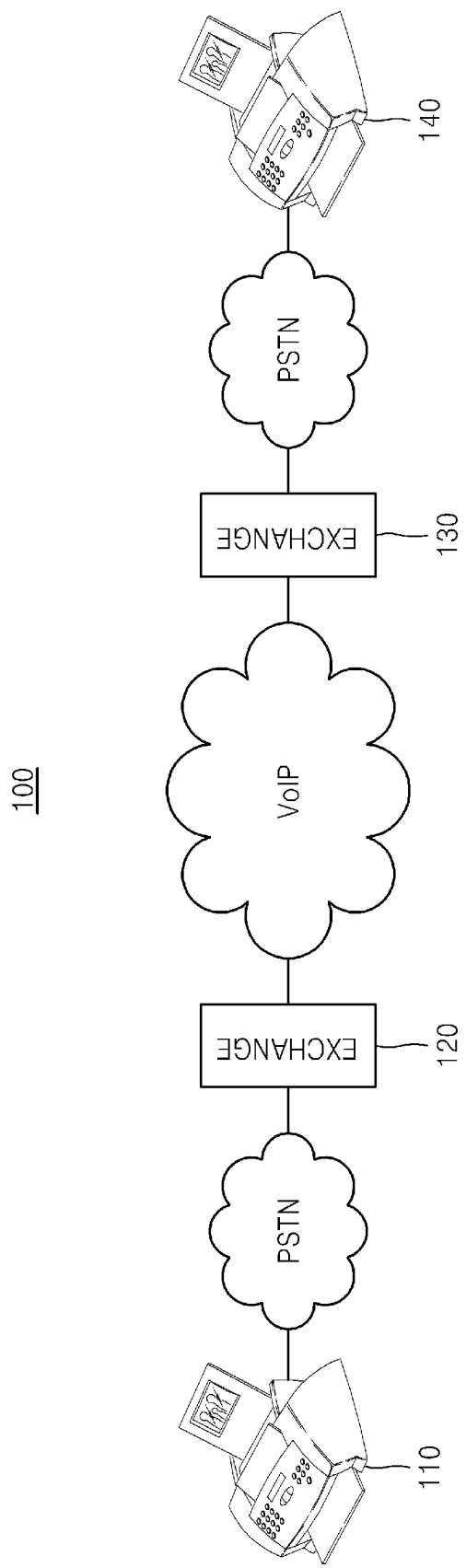
FIG. 1 illustrates a system according to en embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Expressions such as "at least one of," when preceding a list of elements, modify the entire list of elements and do not modify the individual elements of the list.

FIG. 1 illustrates a system 100 according to en embodiment of the present general inventive concept. Referring to FIG. 1, the system 100 includes a sending-side fax machine 110, a receiving-side facsimile (fax) machine 120, a first exchange 120, a second exchange 130, and a receiving-side facsimile (fax) machine 140. Both the sending-side fax machine 110 and the receiving-side fax machine 140 send/receive calls and faxes through a public switched telephone network (PSTN). In addition to the PSTN useable in one or more or all paths from the sending-side fax machine 110 to the receiving-side fax machine 140, a voice over internet protocol (VoIP) network is useable to replace one or more sections of the existing PSTN as illustrated in FIG. 1.

The first exchange 120 and second exchange 130 are located between the PSTN and the VoIP network and play roles in converting a voice signal received from the PSTN to a packet to be transmitted to the VoIP network or converting the packet received from the VoIP network to a voice signal to be transmitted to the PSTN. These converting processes may include processes of converting an analogue signal to a digital signal or reversely converting the digital signal to the analogue signal, band pass filtering a signal, encoding and decoding. Thus, in the converting processes, noise may increase or a portion of data may be lost. In addition, if a packet is transmitted through the VoIP network, the loss of at least a portion of one or more packets may occur. In addition, even if the VoIP network ensures a real time property, a transmission/reception timing of the voice signal may be delayed compared to the PSTN because data is compressed and transmitted on a packet basis.

The properties of this VoIP network may cause more problems in the handshaking process between the sending-side fax machine 110 and receiving-side fax machine 140 than a problem occurring when sending/receiving fax documents. In order to send/receive the fax documents, the handshaking of the sending-side fax machine 110 and receiving-side fax machine 140 should be successfully carried out. If the handshaking is successfully carried out, fax documents may at least be transmitted even if the quality of the fax documents becomes lower due to an increase in noise or the loss of a portion of data. However, when the handshaking has been failed, one or more fax documents may not be successfully transmitted. Thus, the present general inventive concept provides a method and device that may enhance a probability to succeed the handshaking between the sending-side fax machine 110 and receiving-side fax machine 140 in an environment in which the VoIP network and PSTN are used together.

Figure 2A:
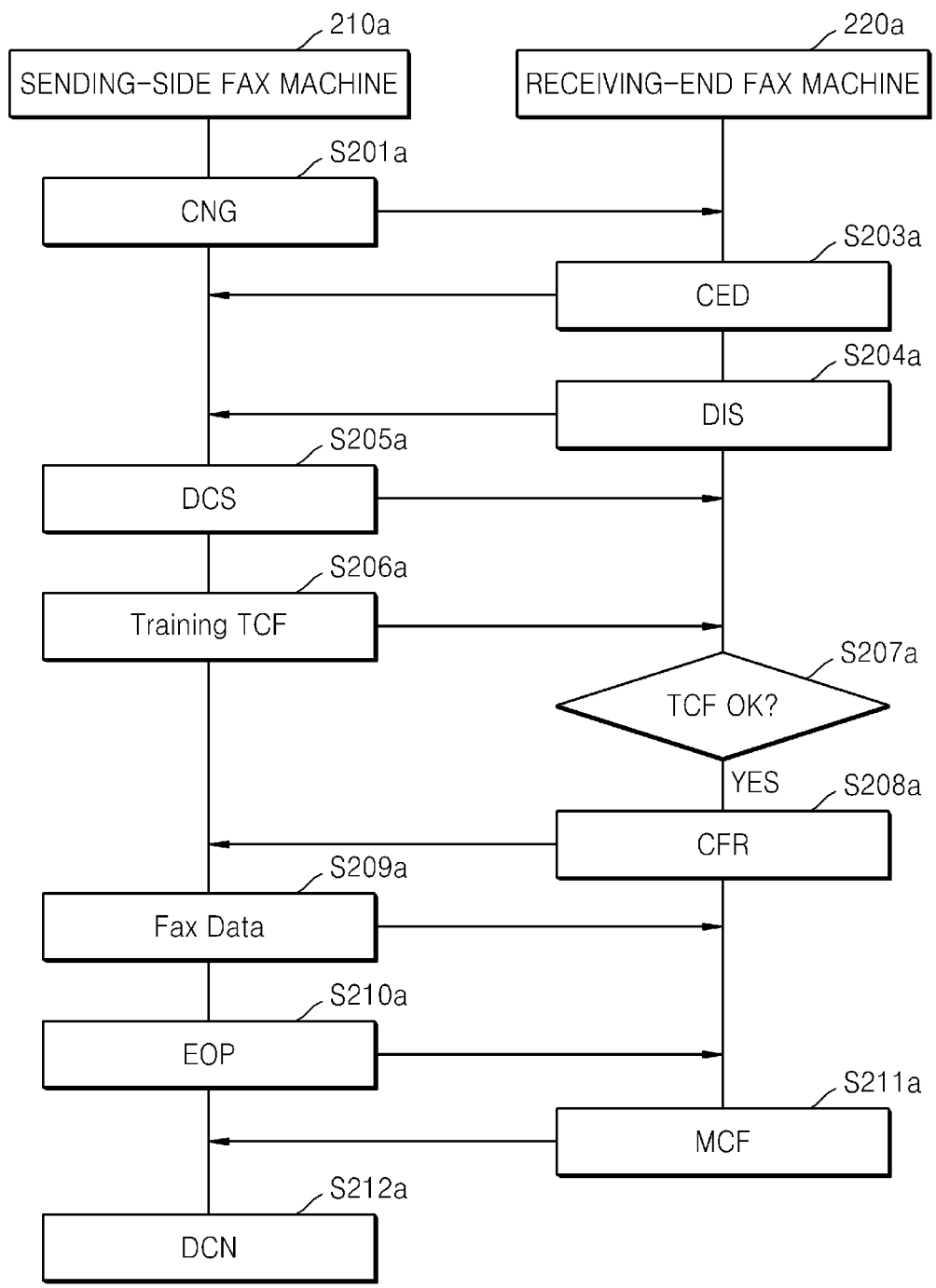
FIGS. 2A and 2B illustrate a handshaking method on the basis of T.30 protocol.
Figure 2B:
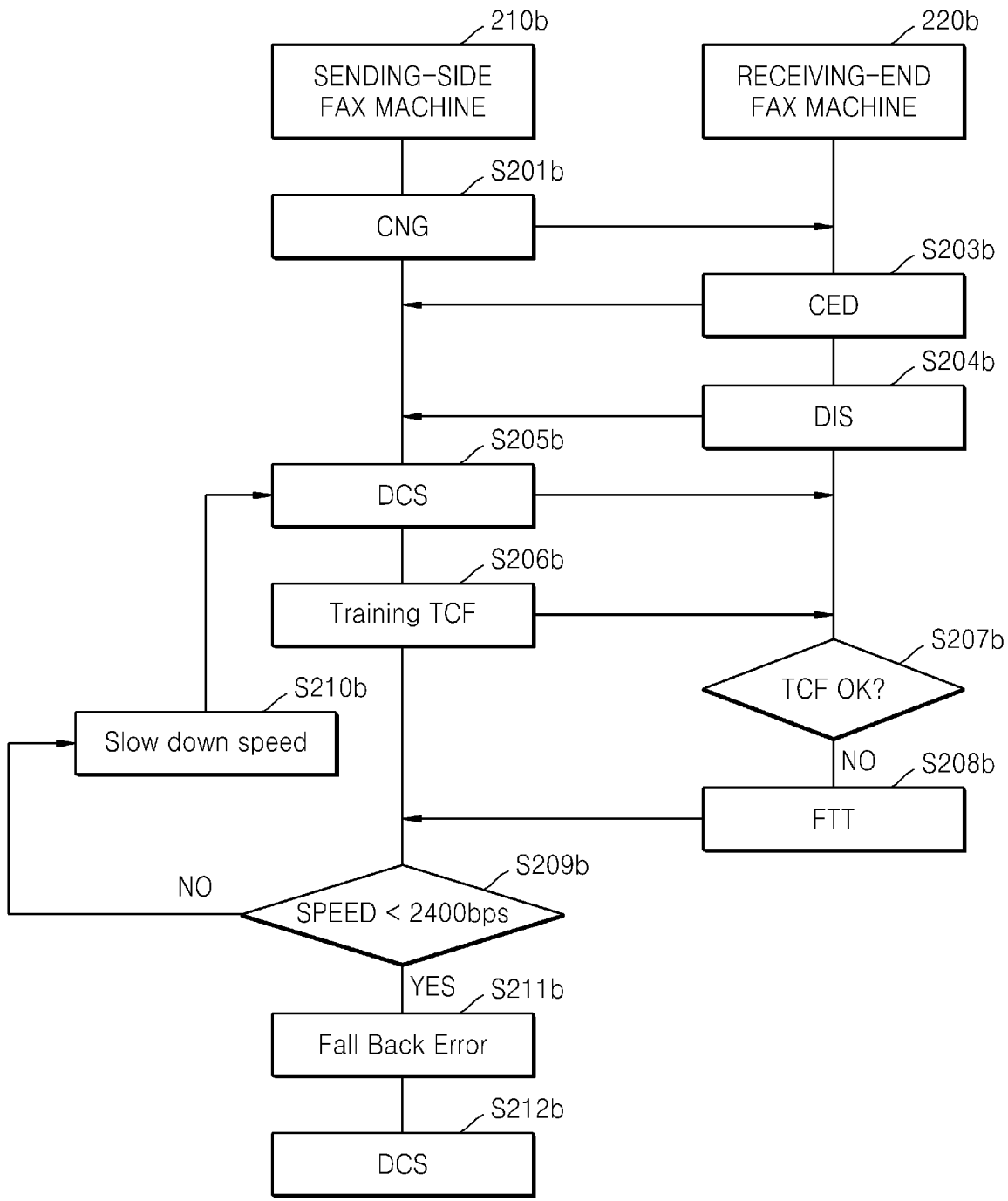

FIGS. 2A and 2B illustrate flows of a general handshaking method on the basis of T.30 protocol in the system 100 of FIG. 1 according to an embodiment of the present general inventive concept. The T.30 protocol is described in a recommendation of international telecommunication union (ITU) series T (terminals for telematic services). The T.30 protocol defines the transmitting procedures between document fax machines in the PSTN. The success and failure procedures of the handshaking according to the T.30 protocol will be simply discussed below with reference to FIGS. 2A and 2B.

FIG. 2A represents a flow when handshaking has been succeeded. Referring to FIG. 2A, a sending-side fax machine 210a transmits a CNG signal to a receiving-side fax machine 220a in operation S201a. The CNG means a calling tone indicating a fax machine, not a general phone terminal. More specifically, the CNG signal indicates a signal that has a frequency of 1100 Hz and becomes "On" for 0.5 second and "Off" for 3 seconds within a period.

The receiving-side fax machine 220a transmits a CED signal to the sending-side fax machine 210 as a response to the CNG signal in step S203a. The CED signal is a tone to identify a receiving-side fax machine and more specifically, is transmitted for a period, for example, 2.6 to 4.0 seconds within a frequency of 2100 Hz.

Subsequently, the receiving-side fax machine 220a transmits a digital identification signal (DIS) message in operation S204a. The DIS message includes information on the capability of the receiving-side fax machine 220a. The DIS message may include, for example, information on a highest data rate of a fax document that the receiving-side fax machine 220a may receive, a maximum size, a resolution and an error correction mode (ECM).

The sending-side fax machine 210a transmits a digital command signal (DCS) as a response to the DIS message in operation S205a. The DCS message includes information on a data rate to be usable for the transmission of a fax document, the resolution of the fax document and a compression technique. The information included in the DCS message, for example, the data rate is selected by the sending-side fax machine 210a on the basis of the DIS message. As an example, if the highest data rate of the sending-side fax machine 210a is 33600 bps but the highest data rate of the receiving-side fax machine 220a included in the DIS message is 14400 bps, the sending-side fax machine 210a selects a data rate to transmit a fax document as 14400 bps.

Subsequently, the sending-side fax machine 210a transmits a training check function (TCF) message to the receiving-side fax machine 220a in operation S206. The TCF message is a message to pretest data transmission/reception at the selected data rate prior to transmitting a fax document. The TCF message indicates a message including one or more 0-bit strings in a data field of a high-level data link control (HDLC) frame. The HDLC frame is a transmission protocol usable in a data link layer and is used to verify whether data has been successfully sent and/or received. According to T.30 standard, the TCF message is transmitted for a time duration of 1.5 seconds±an error range of 10%. That is, a plurality of same HDLC frames are repetitively transmitted for preset time duration 1.5 seconds±10%.

The receiving-side fax machine 220a receives the TCF message and determines whether the TCF message has been received successfully, in operation S207a. That is, it analyzes the HDLC frames transmitted by the sensing-side fax machine 210a and checks whether the 0-bit strings included in the data field have been properly transmitted. Through such processes, if it is determined that the HDLC frames have been received without loss more than predetermined times, the sending-side fax machine 210a determines that the TCF message has been received successfully.

The receiving-side fax machine 220a transmits a confirmation to receive (CFR) message to inform the sending-side fax machine 210a that the TCF message has been received successfully, in operation S208a.

The sending-side fax machine 209a transmits fax document data in operation S209a. The sending-side fax machine 209a transmits end of procedure (EOP) if the transmission of the fax document data is completed, in step S210a.

The receiving-side fax machine 220a transmits a message confirmation (MCF) to the sending-side fax machine 211a to inform that it has received a fax document, in operation S211a.

The sending-side fax machine 209a ends a line connection as a disconnection operation (DCN) to the receiving-side fax machine 220a in operation S212a.

FIG. 2B represents a case of when handshaking has been failed. Since operations S201b to S207b of FIG. 2B are same as or similar to operations S201a to S207a of FIG. 2A. Therefore, detailed thereof will be omitted hereinafter. However, in operation S207b of FIG. 2B corresponding to operation S207a of FIG. 2A, it is determined that the receiving-side fax machine 220b has not successfully received the TCF message.

The receiving-side fax machine 220b transmits a failure-to-train (FTT) message to inform that the TCF message has not been received successfully, to the sending-side fax machine 210b, in operation S208b.

The sending-side fax machine 210b determines whether the data rate selected to transmit a fax document is lower than or equals to the lowest data rate, in operation S209b. For example, the lowest data rate is 2400 bps according to V.17 standard. In this case, the sending-side fax machine 210b determines whether the selected data rate is lower than or equals to 2400 bps.

If the selected data rate is 2400 bps, the sending-side fax machine 210b outputs a fallback error representing failure of transmitting a fax document in operation S211b and ends the connection in operation S212b.

If the selected data rate is above 2400 bps, the sending-side fax machine 220b slows down the data rate of a fax document step by step in operation S210b and returns to operation S205b. That is, according to V.17 standard, the sending-side fax machine 220b may select a data rate of 14400 bps, 12000 bps, 9600 bps, 7200 bps, 4800 bps, and 2400 bps step by step. When the TCF message is successfully received in operation S207b of FIG. 2B, operation S208a of FIG. 2A is performed to transmit a confirmation-to-receive (CFR) message to inform the sending-side fax machine 210a that the TCF message has been successfully received.

Figure 3:
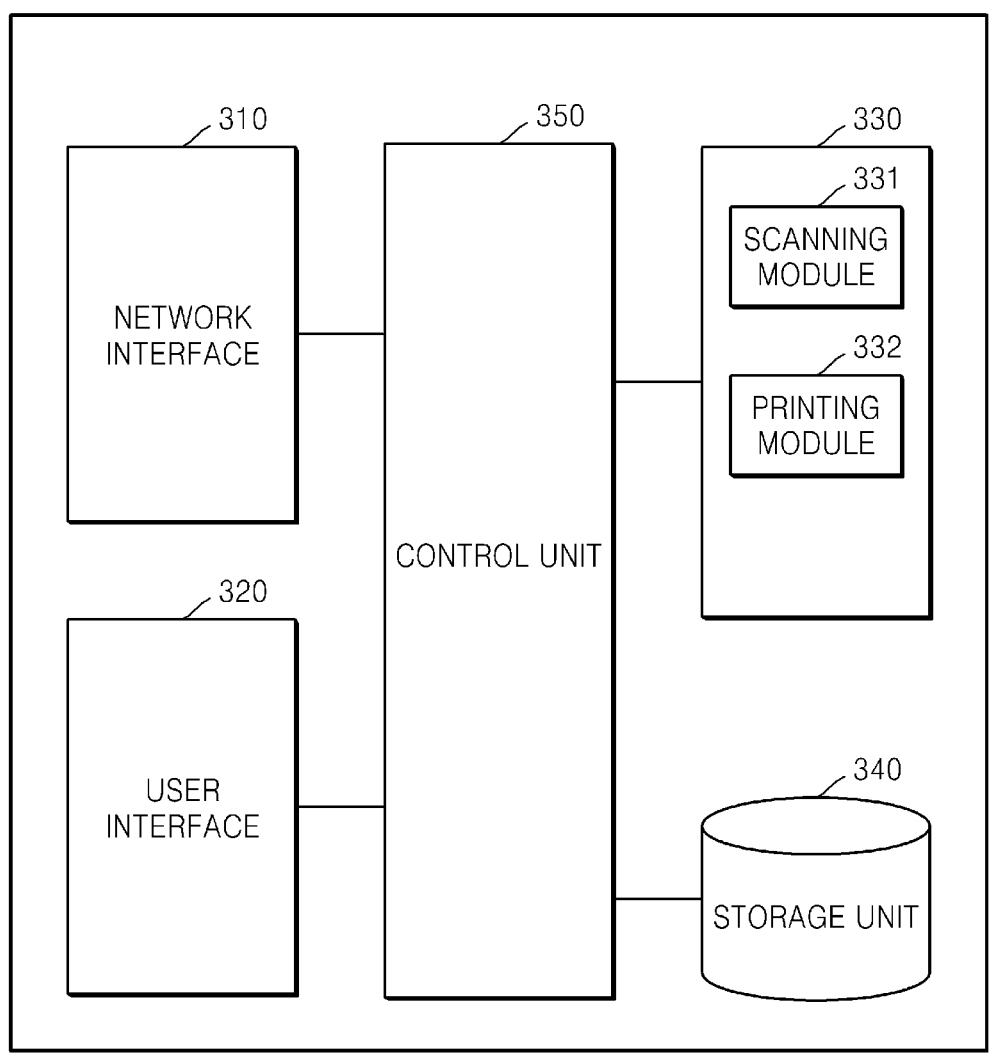
FIG. 3 illustrates a fax machine according to an embodiment of the present general inventive concept.

FIG. 3 is illustrates a facsimile (fax) machine 300 according to an embodiment of the present general inventive concept. Referring to FIG. 3, the fax machine 300 includes a network interface 310, a user interface 320, a functional module 330, a storage unit 340, and a control unit 350.

The network interface 310 sends/receives fax documents through a PSTN and/or a VoIP network. In addition, the network interface 310 sends/receives messages according to T.30 protocol to/from other fax machines according to the control of the control unit 350.

The user interface 320 receives a manipulation from a user and displays the manipulated result for the user. The user interface 110 may include a user input key to receive the manipulation from the user. The user input key may be embodied as a physical button or on a touch screen. The user interface 320 may include a display unit (not illustrated) to display the manipulated result for the user. The display unit (not illustrated) may be embodied as a touch screen including the function of the user input key.

The user interface 320 may provide a graphic user interface (GUI) to set a TCF flag value, as will be described below. That is, the user interface 320 may provide the graphic user interface (GUI) to select a custom mode to change a time duration of transmitting the HDLC frames. Here, the custom mode may, for example, be an oversea mode or a VoIP mode.

If a user selects the custom mode, the user interface 320 may provide a graphic user interface (GUI) through which the user may adjust the time duration of transmitting the HDLC frames. For example, the user interface 320 may provide a GUI that enables the user to directly input the time duration or provides a bar for adjusting the time duration.

The functional module 330 scans and outputs one or more fax documents. The scanning module 331 scans original documents and creates images for one or more fax documents. The printing module 332 outputs the fax documents scanned by the scanning module 331 or outputs the fax documents received through the network interface 310.

The storage unit 340 stores one or more documents scanned by the scanning module 331. In addition, it stores the fax documents received through the network interface 310. Besides, the storage unit 340 may store the files arbitrarily stored by a user or firmware and machine setting values for driving the fax machine 300.

The control unit 340 controls the network interface 310 according to T.30 protocol to control the handshaking with an external receiving-end fax machine (not illustrated). The control unit 340 transmits information on a first data rate selected to transmit fax documents, to the receiving-side fax machine. That is, the control unit 340 may transmit a digital command signal (DCS) described in FIG. 2A above. Here, the first data rate may be any one of 14400 bps, 12000 bps, 9600 bps, 7200 bps, 4800 bps, and 2400 bps according to V.17 standard from international telecommunication union (ITU) recommendation.

The control unit 340 transmits a plurality of frames including bit strings predefined to test data transmission/reception at the first data rate to the receiving-side fax machine, prior to transmitting the fax document. For example, the control unit 340 may transmit a training check function (TCF) message.

Here, the control unit 340 determines a time duration of transmitting the frames based on at least one of the TCF flag value set to the fax machine 300 and the first data rate selected. Embodiments in which the control unit 340 determines the time duration will be described in more detail with reference to FIGS. 4 though 9.

The control unit 340 receives a message informing the success or failure of a test through the network interface 310. Here, the message informing the success of the test may be the confirmation to receive (CFR) described in FIG. 2A and a message informing the failure of the test may be the FTT described in FIG. 2B.

Figure 4:
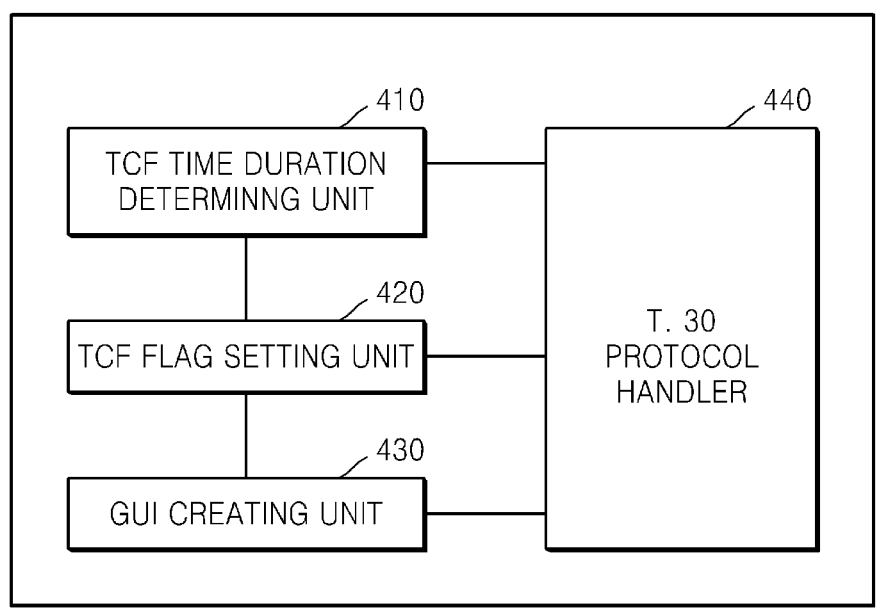
FIG. 4 illustrates a control unit of a fax machine according to an embodiment of the present general inventive concept.

FIG. 4 is illustrates a control unit 400 of a facsimile (fax) machine according to an embodiment of the present general inventive concept. Referring to FIG. 4, the control unit 400 includes a TCF time duration determining unit 410, a TCF flag setting unit 420, a GUI creating unit 430, and a T.30 protocol handler 440.

The T.30 protocol handler 440 controls overall procedures by T.30 protocol. For example, the T.30 protocol handler 440 may select a first data rate, at which one or more fax documents are to be transmitted, and transmit information on the first data rate to the receiving-side fax machine. The T.30 protocol handler 440 transmits frames to test data transmission/reception to the receiving-side fax machine during the time duration determined by the TCF time duration determining unit 410. The T.30 protocol handler 440 receives a message informing the success of a test and then starts sending one or more fax documents or receives a message informing the failure of the test and then outputs a fallback error.

The TCF time duration determining unit 410 determines a time duration of transmitting a plurality of frames including a predefined bit string, in order to pretest the data transmission/reception at the first data rate. The TCF time duration determining unit 410 may determine the time duration according to at least one of the TCF flag value and the first data rate.

When determining a time duration with reference to the TCF flag value, the TCF time duration determining unit 410 checks whether the TCF flag setting unit 420 has activated or deactivated the TCF flag value. If the TCF flag value has been activated, the TCF time duration determining unit 410 increases the time duration. For example, the TCF time duration determining unit 410 may transmit the frames for a first time duration if the TCF flag value has been deactivated, and it may transmit the frames for a second time duration if the TCF flag value has been activated. At this point, the first time duration may be 1.5 seconds±an error of 10% and the second time duration may be a time duration exceeding the first time duration. The second time duration may be a preset value, for example 2.5 seconds and may be a value which increases step by step as the failure of handshaking is accumulated. See FIGS. 7 and 9 with respect to an embodiment using the TCF flag value.

The TCF time duration determining unit 410 may otherwise determine a time duration with reference to the first data rate. The TCF time duration determining unit 410 compares the first data rate with threshold preset to the fax machine 300. Here, the threshold may be the lowest data rate of the fax machine 300. It is possible that the threshold may be a rate within a range of 2400 bps to 14400 bps, not the lowest data rate and may be a value preset according to a design or user preference. The TCF time duration determining unit 410 increases a time duration if the first data rate is below the preset threshold. See the description above with respect to a method of increasing a time duration.

The TCF time duration determining unit 410 may determine a time duration with reference to both the TCF flag value and a value for the first data rate. For example, it is assumed that the FTT has been received from the receiving-side fax machine and the TCF flag setting unit 420 has activated the TCF flag value. The TCF time duration determining unit 410 may increase a time duration only if the TCF flag value is activated and at the same time, the first data rate is the lowest data rate of the fax machine 300.

The T.30 protocol handler 440 resends one or more frames on the basis of the time duration increased by the TCF time duration determining unit 410, if a message informing the failure of a test is received. The T.30 protocol handler 440 may output a fallback error representing the failure in transmitting fax documents, if a message informing the failure of a test is again received even after retransmitting frames.

If a message informing the failure of the test is again received even after transmitting the frames, the TCF time duration determining unit 410 may otherwise increase the time duration step by step until a message informing the success of the test is received, and the T.30 protocol handler 440 may repeat an operation of retransmitting frames.

It is possible that if it is determined that a first data rate is not the lowest data rate, the TCF time duration determining unit 410 may decrease a data rate step by step until a message informing the success of a test is received and the T.30 protocol handler 440 may repeat an operation of retransmitting frames.

The TCF flag setting unit 420 activates or deactivates a TCF flag value indicating whether to change a TCF time duration. The TCF flag setting unit 420 may activate or deactivate the TCF flag value on the basis of the input of a user.

The TCF flag setting unit 420 may otherwise check the previous transmission history of fax documents to a receiving-side fax machine and activate the TCF flag value if there is a transmission failure history. At this time, the TCF flag setting unit 420 may check whether there was a fallback error while in the past, transmitting the same fax document as that to be currently transmitted. That is, the TCF flag setting unit 420 determines whether a current fax document transmission job is a retry job.

It is possible that the TCF flag setting unit 420 may activate the TCF flag if a FTT message is received from the receiving-side fax machine. The TCF flag setting unit 420 may activate the TCF flag only if the TFF message is received at a specific rate.

If the TCF flag setting unit 420 may initialize the TCF flag value if CFR or MCF is received.

The GUI creating unit 430 creates a GUI and displays it through a user interface 320. The GUI creating unit 430 creates a graphic user interface (GUI) to select a custom mode which enables a user to change a time duration and provides the GUI to a user through the user interface 320. Here, if the custom mode is selected, the GUI creating unit 430 may create and provide a graphic user interface (GUI) enabling to adjust a value for the time duration.

Figure 8:
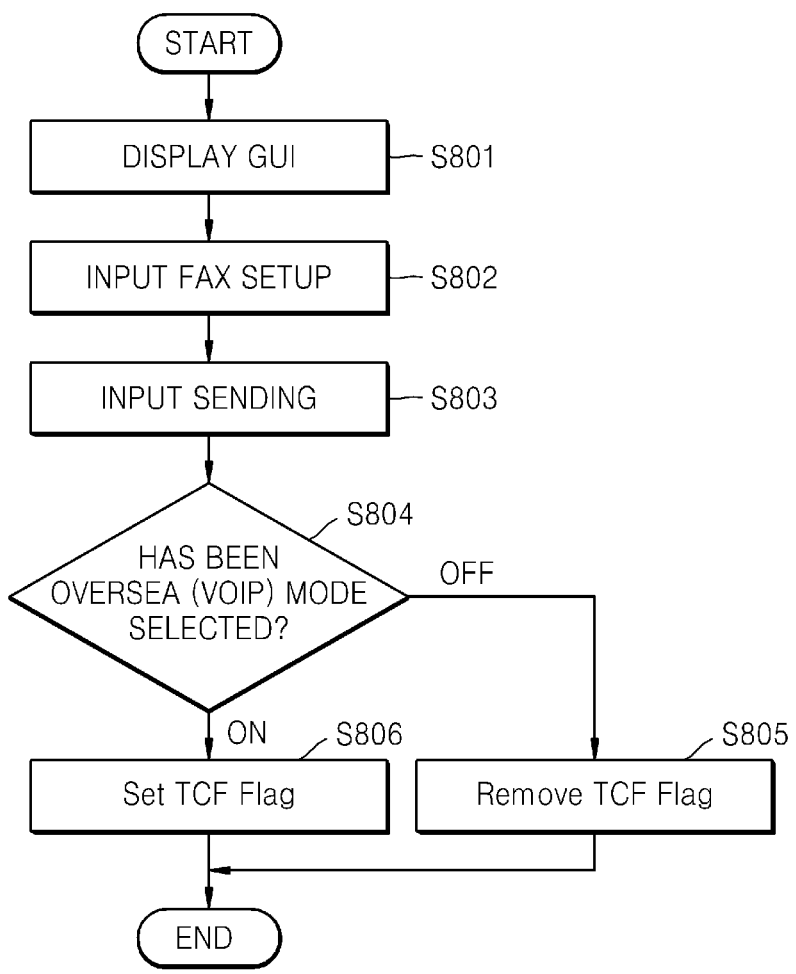
FIG. 8 illustrates a method of setting a TCF flag in the method of FIG. 7.

Referring to FIGS. 4 and 8, the control unit 400 displays a menu GUI through a user interface 320 in operation S801.

Subsequently, the user interface 320 receives transmission setting from a fax machine setting menu from a user in operations S802 and S803. Here, the control unit 400 creates a graphic user interface (GUI) to select a custom mode and provides the GUI to a user through the user interface 320. Here, the custom mode may be an oversea mode or a VoIP mode.

The control unit 400 determines whether the custom mode has been selected, in operation S804. The control unit 400 activates the TCF flag if the custom mode has been selected, in operation 806. The control unit 400 deactivates the TCF flag if the custom mode has not been selected, in operation S805.

Figure 5:
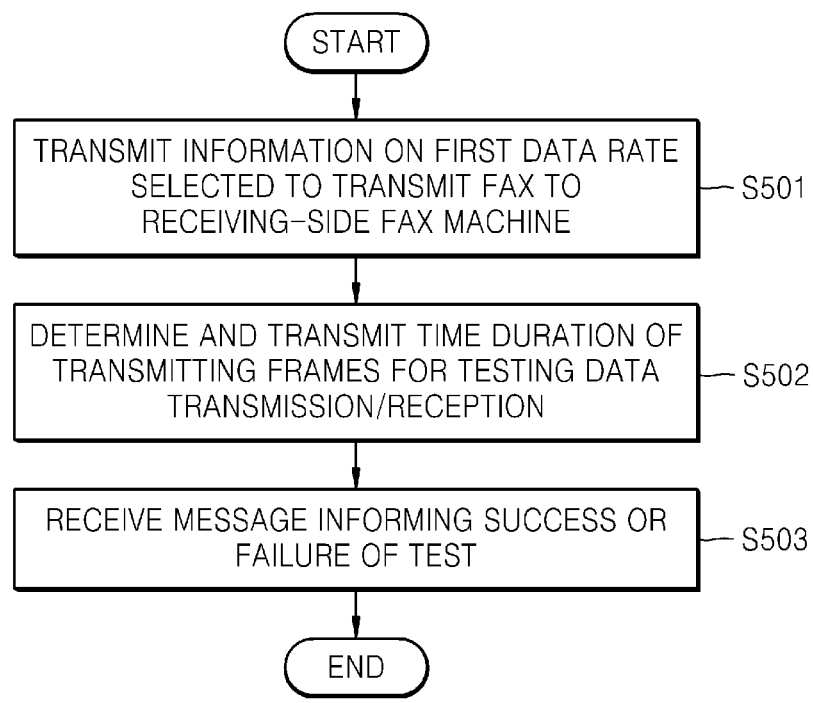
FIG. 5 illustrates a handshaking method according to an embodiment of the present general inventive concept.

FIG. 5 is a flowchart illustrating a handshaking method according to an embodiment of the present general inventive concept. The method of FIG. 5 may be performed in the system 100 and the fax machine 300 and/or according to the handshaking method, as illustrated in FIGS. 1 through 4. Thus, detail descriptions thereof will be omitted. In addition, in the embodiment of FIG. 5, it is assumed that CNG transmission, CED reception, and DIS reception processes regulated by T.30 protocol have been already performed.

First, the fax machine 300 transmits information on a data rate selected to transmit fax documents to a receiving-side fax machine (not illustrated) in operation S501. For example, the fax machine 300 transmits a digital command signal that includes information on the first data rate, the resolution of a scan image, and the compression technique of the scan image. Here, the first data rate may be any one of 14400 bps, 12000 bps, 9600 bps, 7200 bps, 4800 bps, and 2400 bps.

The fax machine 300 transmits one or more frames including one or more bit strings predefined to test data transmission/reception at the first data rate, to the receiving-side fax machine prior to transmitting a fax document in operation S502. That is, the fax machine 300 transmits a training check function (TCF) message in which 0-bit strings are included in a data field of a high-level data link control (HDLC) frame.

In operation S502, the fax machine 300 transmits after determining a time duration of transmitting the frames considering at least one of a TCF flag value and a value for the first data rate. See FIGS. 3 and 4 described above and FIGS. 6 through 9 described below with respect to a detailed embodiment in which the fax machine 300 determines a time duration.

The fax machine 300 receives a message informing the success or failure of a test in operation S503. That is, the fax machine 300 receives a confirmation to receive (CFR) message informing the success of the test or receives a failure to train (FTT) message informing the failure of the test.

In operation S503, the fax machine 300 may initialize a TCF flag value if a message informing the success of the test is received.

In operation S503, the fax machine 300 determines whether the first data rate is the lowest data rate of the fax machine 300 if the message informing the success of the test is received. If it is determined as the lowest data rate, the fax machine 300 may increase the time duration and retransmit the frames of operation S502 on the basis of the increased time duration. If the message informing the failure of a test is again received even after retransmitting the frames, the fax machine 300 may output a fallback error representing the failure in transmitting fax documents.

If the message informing the failure of the test is again received after retransmitting frames, the fax machine 300 may otherwise retransmit frames repetitively while increasing a time duration required to transmit the frames of operation S502 step by step until the message informing the success of the test is received.

It is possible that if it is determined that a first data rate is not the lowest data rate of the sending-side fax machine, the fax machine 300 may repetitively retransmit the frames of operation S502 while decreasing a data rate step by step until the message informing the success of the test is received.

Figure 6:
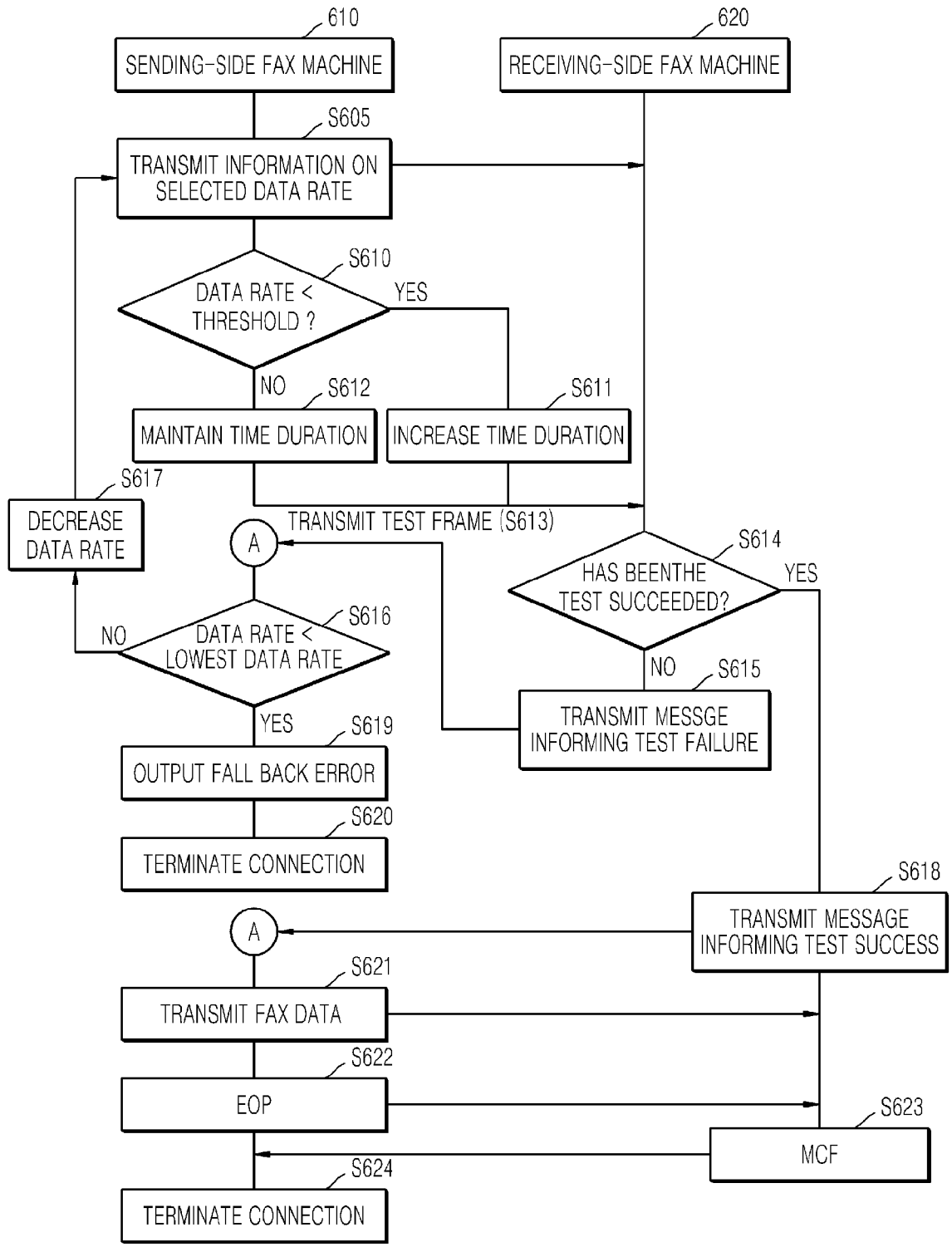
FIG. 6 illustrates a method of determining a time duration of transmitting one or more test frames in the handshaking method of FIG. 5.

FIG. 6 illustrates a method of determining a time duration of transmitting test frames in the handshaking method of FIG. 5 according to an embodiment of the present general inventive concept.

First, a sending-side fax machine 610 transmits information on a selected data rate to a receiving-side fax machine 620 in step S605.

Subsequently, the sending-side fax machine 610 determines whether the selected data rate is lower than or equals to threshold, in operation S610. At this point, the threshold may be the lowest data rate of the fax machine 300. As another embodiment, the threshold may be a rate within a range of 2400 bps to 14400 bps, not the lowest data rate and may be a value preset by a user or manufacturer.

The sending-side fax machine 610 determines to increase a time duration required to transmit frames if the selected data rate is lower than or equals to the threshold, in operation S611. For example, if the time duration currently set to the sending-side fax machine 610 is a first time duration, the sending-side fax machine 610 determines to transmit frames for a second time duration exceeding the first time duration. For example, at this point, the first time duration may be 1.5 seconds±an error of 10% and the second time duration may be a time duration exceeding 1.5 seconds. The second time duration may be a preset value such as 2.5 seconds and may be a value that increases step by step as the failure of handshaking is accumulated.

The sending-side fax machine 610 determines not to increase but to maintain the time duration as it is, if the selected data rate exceeds the threshold, in operation in S612. That is, the sending-side fax machine 610 determines to transmit frames during the first time duration described above.

In operation S613, the sending-side fax machine 610 transmits frames during the time duration determined in operations S611 or S612.

The receiving-side fax machine 620 determines the success/failure of a test depending on whether frames have been received successfully, in step S614.

If the test is successful, the receiving-side fax machine 620 transmits a CFR message informing the success of the test to the sending-side fax machine in operation S618. Subsequently, the sending-side fax machine transmits one or more fax documents and transmits EOP representing that the transmission of the fax documents has been completed, in operations S621 and S622. The receiving-side fax machine 620 transmits MCF representing that it has received the fax documents, in operation S623. Then, the line connection between the sending/receiving fax machines 610 and 622 terminates in operation S624.

If the test is unsuccessful, the receiving-side fax machine 620 transmits a FTT message informing the failure of the test to the sending-side fax machine in operation S615.

The sending-side fax machine 610 determines whether the first data rate is lower than or equals to the lowest data rate in operation S616. For example, it determines whether the first data rate is lower than or equals to 2400 bps.

If the first data rate is lower than or equals to the lowest data rate, the sending-side fax machine 610 outputs a fallback error and terminates the connection, in operations S619 and S620.

If the first data rate exceeds the lowest data rate, the sending-side fax machine 610 decreases a data rate in operation 617. For example, if the first data rate has been 12000 bps, it selects a second data rate of 9600 bps lower than the first data rate. Subsequently, the sending-side fax machine 610 returns to operation S605 and repetitively performs steps described above.

Figure 7:
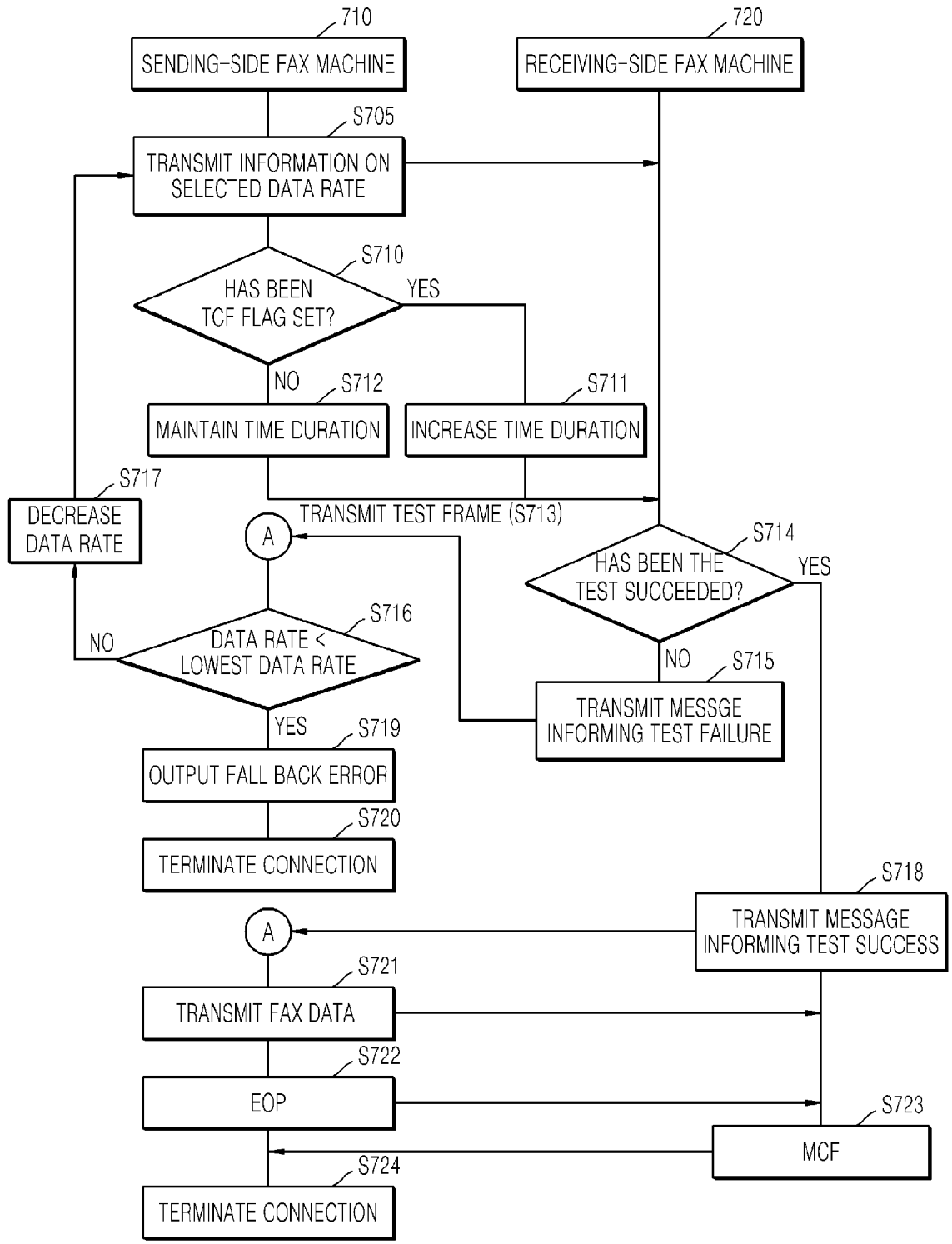
FIG. 7 illustrates a method of determining a time duration of transmitting test frames in the handshaking method of FIG. 5.

FIG. 7 illustrates a method of determining a time duration of transmitting one or more test frames in the handshaking method of FIG. 5 according to an embodiment of the present general inventive concept. Since the method of FIG. 7 is similar to the method of FIG. 6 except operation S710, detail descriptions thereof will be omitted.

After operation S705, the sending-side fax machine 710 determines whether a TCF flag has been activated, in operation S710. See the descriptions of FIG. 8 discussed above with respect to a method of activating the TCF flag according to a user input.

If the TCF flag is activated, the sending-side fax machine 710 determines to increase the time duration in operation S711.

If the TCF flag is deactivated, the sending-side fax machine 710 determines to maintain the time duration in operation S712.

In operation S713, the sending-side fax machine 710 transmits frames during the time duration determined in operations S711 or S712. The rest operations are performed in the same way as in FIG. 6.

FIG. 9 illustrates a method of determining a time duration of transmitting one or more test frames in the handshaking method of FIG. 5 according to an embodiment of the present general inventive concept. Since the method of FIG. 9 is similar to the methods of FIGS. 6 and 7, detail descriptions thereof will be omitted Referring to FIGS. 5 through 9, the sending-side fax machine 910 determines whether the TCF flag value has been activated, in operation S910. If the TCF flag is activated, the sending-side fax machine 910 determines to increase the time duration in operation S911. If the TCF flag is deactivated, the sending-side fax machine 710 determines to maintain the time duration in operation S912.

The method of FIG. 9 is, however, different from the method of FIG. 7 in an operation of activating the TCF flag value.

According to the method of FIG. 9, the TCF flag is set on the basis of a previous transmission history of one or more fax documents to the receiving-side fax machine 920.

In operation S916, the sending-side fax machine 910 outputs a fallback error if failed to transmit faxes. At this point, the sending-side fax machine 910 terminates the connection when it fails to transmit fax documents, in operation S920.

The sending-side fax machine 910 may again register a transmission job of fax documents with a machine in order to retry the transmission of the fax documents. According to the embodiment of FIG. 9, the time duration is increased in the transmission job of fax documents to be retried to transmit the frame of operation S913.

If the connection terminates after operation S920, the sending-side fax machine 910 activates a TCF flag in order to represent that the transmission of fax documents to the receiving-side fax machine 920 has failed, in operation S925.

Subsequently, the sending-side fax machine 910 registers the transmission job of fax documents failed as a retry job with the sending-side fax machine 910, in step S926. If the transmission job of fax documents are registered as the retry job, the sending-side fax machine 910 returns to step S905 and again performs the illustrated job processes.

If the time duration has been increased, relatively many frames are transmitted to the receiving-side fax machine 920. As a result, the number of normal frames among those received from the receiving-side fax machine 920 increases. For example, it is assumed that the sending-side fax machine 910 has transmitted frames for 1.5 seconds and the receiving-side fax machine 920 has normally received n frames. Here, if the sending-side fax machine 910 transmits frames for 3 seconds, the receiving-side fax machine 920 will normally receive 2*n frames stochastically. As a result, if the time duration increases, the number of normal frames among those received by the receiving-side fax machine 920 increases and thus there is a high probability that a test succeeds. If the test succeeds, the handshaking between the sending/receiving fax machines 910 and 920 is finished and it is possible to transmit fax documents although some noise is included.

The embodiments of the present general inventive concept may enhance a probability that a communication succeeds between fax machines performing handshaking on the basis of T.30 protocol in an environment in which a VoIP network and a PSTN network are usable in communication paths.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVD ROMS, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains While this the present general inventive concept has been particularly shown and described with reference to preferred embodiments thereof, it will be understood by those skilled in the art that various changes in form and details may be made therein without departing from the spirit and scope of the present general inventive concept as defined by the appended claims and their equivalents.

What is claimed is:

1. A method of performing handshaking between fax machines on the basis of T.30 protocol, wherein a sending-side fax machine:
   transmits information on a first data rate selected to transmit a fax document, to a receiving-side fax machine;
   transmits a plurality of frames including one or more bit strings to the receiving-side fax machine, which are predefined to test data transmission/reception at the first data rate prior to transmitting the fax document; and
   receives a message informing success or failure of the test, and
   wherein the transmitting of the frames comprises determining a time duration of the transmitting the frames based on at least one of a TCF flag value set to the sending-side fax machine and the first data rate.

2. The method of claim 1, wherein the transmitting of the frames further comprises:
   checking whether the TCF flag value is set; and
   increasing the time duration of the transmitting the frames when the TCF flag value is set.

3. The method of claim 2, wherein:
   the transmitting of the frames comprises transmitting the frames for a first time duration when the TCF flag value is not set and transmitting the frames for a second time duration when the TCF flag value is set; and
   the first time duration is 1.5 seconds±an error of 10% and the second time duration exceeds the first time duration.

4. The method of claim 1, further comprising:
   providing a graphic user interface to select a custom mode to change the time duration; and
   activating the TCF flag value when the custom mode is selected.

5. The method of claim 1, wherein the transmitting of the frames comprises:
checking a previous transmission history of one or more fax documents to the receiving-side fax machine; and
activating the TCF flag value when there is a transmission failure history, as a result of the checking.

6. The method of claim 1, wherein the transmitting of the frames comprises:
comparing the first data rate with a threshold preset to the sending-side fax machine; and
increasing the time duration when the first data rate is lower than or equal to the threshold.

7. The method of claim 1, further comprising:
determining whether the first data rate is the lowest data rate of the sending-side fax machine when the message informing the failure of the test is received;
increasing the time duration required to transmit the frames when it is determined that the first data rate is the lowest data rate of the sending-side fax machine; and
retransmitting the frames on the basis of the increased time duration.

8. The method of claim 7, wherein, when the message informing the failure of the test is received again after the retransmitting of the frames, the retransmitting of the frames is repeated with increasing the time duration step by step until the message informing the success of the test is received.

9. The method of claim 7, wherein when it is determined that the first data rate is not the lowest data rate of the sending-side fax machine, the retransmitting of the frames are repeated with decreasing a data rate step by step until a message informing the success of the test is received.

10. The method of claim 1, further comprising:
initializing the TCF flag value if the message informing the success of the test is received.

11. A non-transitory computer-readable storage medium to contain computer-readable codes as one or more programs to execute the method of claim 1.

12. A sending-side fax machine to perform handshaking with a receiving-side fax machine on the basis of T.30 protocol, the fax machine comprising:
a scanning module to scan a fax document to be transmitted;
a storage unit to store the scanned fax document;
a network interface to transmit the fax document through a public switched telephone network (PSTN) or a voice over internet protocol (VoIP) network; and
a control unit to control the network interface to transmit information on a first data rate selected to transmit the fax document to the receiving-side fax machine, to transmit a plurality of frames including one or more bit strings predefined to test data transmission/reception at the first data rate prior to transmitting the fax document to the receiving-side fax machine, and to
receive a message informing success or failure of the test, wherein the control unit determines a time duration of the transmitting the frames based on at least one of a TCF flag value set to the sending-side fax machine and the first data rate.

13. The fax machine of claim 12, wherein the control unit checks whether the TCF flag value is set, and increases the time duration of the transmitting the frames when the TCF flag value is set.

14. The fax machine of claim 13, wherein:
the control unit transmits the frames for a first time duration if the TCF flag value is not set and transmits the frames for a second time duration if the TCF flag value is set; and
the first time duration is 1.5 seconds±an error of 10% and the second time duration exceeds the first time duration.

15. The fax machine of claim 12, wherein:
the control unit provides a graphic user interface to select a custom mode to change the time duration; and
the control unit activates the TCF flag value when the custom mode is selected.

16. The fax machine of claim 12, wherein the control unit checks a previous transmission history of one or more fax documents to the receiving-side fax machine and activates the TCF flag value if there is a transmission failure history, as a result of the checking.

17. The fax machine of claim 12, wherein the control unit compares the first data rate with threshold preset to the sending-side fax machine and increases the time duration required to transmit the frames when the first data rate is lower than or equal to the threshold.

18. The fax machine of claim 12, wherein the control unit determines whether the first data rate is the lowest data rate of the sending-side fax machine when the message informing the failure of the test is received, increases the time duration required to transmit the frames when it is determined that the first data rate is the lowest data rate of the sending-side fax machine, and retransmits the frames for the increased time duration.

19. The fax machine of claim 18, wherein when the message informing the failure of the test is received again after retransmitting the frames, the control unit repeats an operation of retransmitting the frames with increasing the time duration step by step until the message informing the success of the test is received.

20. The fax machine of claim 18, wherein when it is determined that the first data rate is not the lowest data rate of the sending-side fax machine, the control unit repeats an operation of retransmitting the frames with decreasing a data rate step by step until the message informing the success of the test is received.

* * * * *

UNITED STATES PATENT AND TRADEMARK OFFICE
CERTIFICATE OF CORRECTION

PATENT NO.        : 9,036,216 B2
APPLICATION NO.   : 13/857188
DATED             : May 19, 2015
INVENTOR(S)       : Young-sang Seo et al.

It is certified that error appears in the above-identified patent and that said Letters Patent is hereby corrected as shown below:

In the claims

Claim 12, Column 13, Line 46

Delete "(VoiP)" and insert --(VoIP)--, therefor.

Signed and Sealed this
Thirteenth Day of October, 2015

Michelle K. Lee
*Director of the United States Patent and Trademark Office*